(12) United States Patent
Chikkali et al.

(10) Patent No.: US 9,815,934 B2
(45) Date of Patent: Nov. 14, 2017

(54) ISOHEXIDE-DIACETAL BASED POLYMERS AND A PROCESS THEREOF

(71) Applicant: Council of Scientific & Industrial Research, New Dehli (IN)

(72) Inventors: Samir Hujur Chikkali, Maharashtra (IN); Bhausaheb Shivaji Rajput, Maharashtra (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/890,060

(22) PCT Filed: May 9, 2014

(86) PCT No.: PCT/IN2014/000318
§ 371 (c)(1),
(2) Date: Nov. 9, 2015

(87) PCT Pub. No.: WO2014/181358
PCT Pub. Date: Nov. 13, 2014

(65) Prior Publication Data
US 2016/0083506 A1  Mar. 24, 2016

(30) Foreign Application Priority Data
May 9, 2013  (IN) .......................... 1386/DEL/2013

(51) Int. Cl.
| | |
|---|---|
| *C08G 2/20* | (2006.01) |
| *C08G 2/24* | (2006.01) |
| *C08L 59/00* | (2006.01) |
| *C08L 61/00* | (2006.01) |
| *C08G 61/12* | (2006.01) |

(Continued)

(52) U.S. Cl.
CPC ............ *C08G 61/125* (2013.01); *C08G 2/10* (2013.01); *C08G 2/18* (2013.01); *C08G 2/24* (2013.01); *C08L 59/00* (2013.01); *C08L 61/00* (2013.01); *C08G 2261/12* (2013.01)

(58) Field of Classification Search
CPC ........................................................ C08G 2/20
USPC ......................................................... 528/408
See application file for complete search history.

(56) References Cited

U.S. PATENT DOCUMENTS 3,484,459 A  12/1969 Hartmann
2008/0009599 A1  1/2008 East et al.

FOREIGN PATENT DOCUMENTS

| EP | 2143743 | 1/2010 |
| WO | 2008147473 | 12/2008 |
| WO | 2012123267 | 9/2012 |

(Continued)

OTHER PUBLICATIONS

International Search Report and Written Opinion for International Patent Application No. PCT/IN2014/000318, dated Nov. 10, 2014.

(Continued)

*Primary Examiner* — Duc Truong
(74) *Attorney, Agent, or Firm* — McDonald Hopkins LLC

(57) ABSTRACT

Potentially degradable isohexide based compounds and their polymers, derived from renewable resources, are described. Degradable isohexide-based monomers and polymers obtained from renewable resources are also described. Finally, processes for synthesizing such degradable polymers via copolymerization of the isohexide-based monomers and long chain diols are disclosed.

11 Claims, 13 Drawing Sheets

Figure 1:
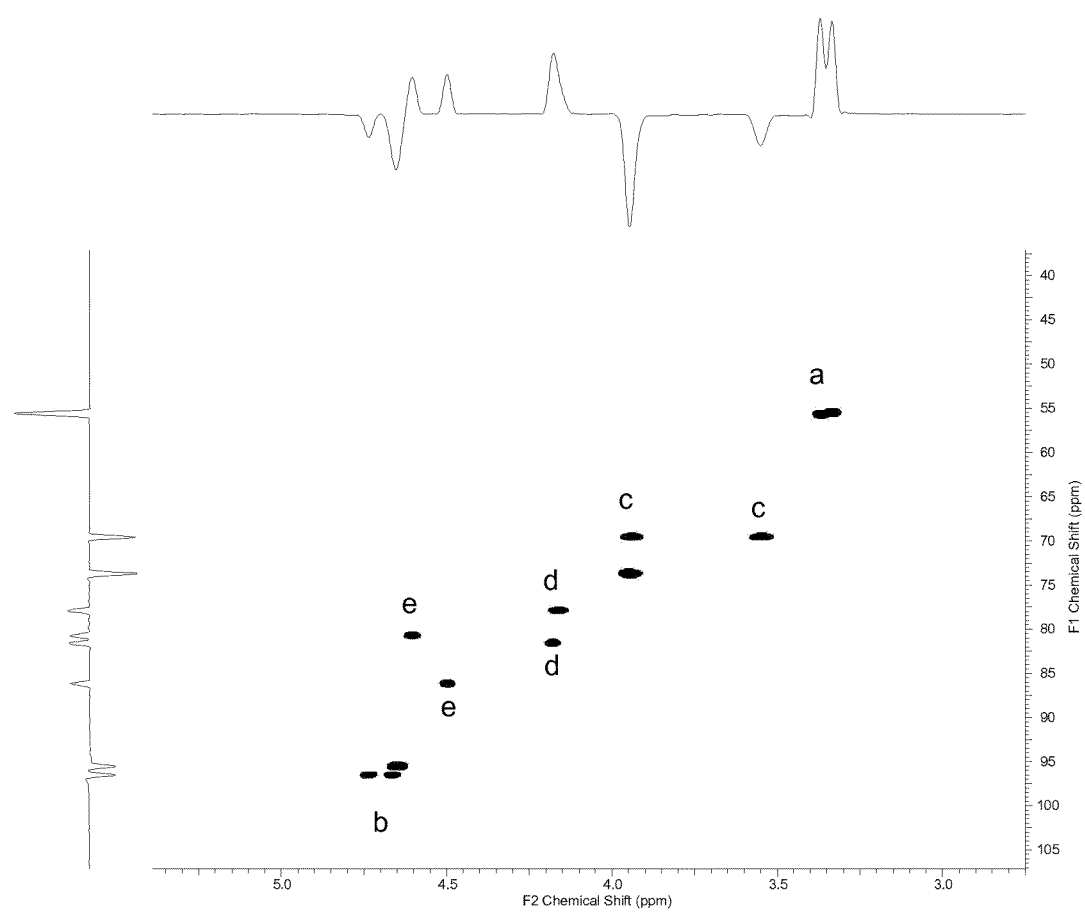

(51) Int. Cl.
*C08G 2/10* (2006.01)
*C08G 2/18* (2006.01)

(56) References Cited

FOREIGN PATENT DOCUMENTS

WO 2012129070 9/2012
WO 2014181358 11/2014

OTHER PUBLICATIONS

International Preliminary Report on Patentability for International Patent Application No. PCT/IN2014/000318, dated Jul. 16, 2015.
Sablong, et al.; Incorporation of Isosorbide Into Poly(butylene terephthalate) via Solid-State Polymerization; Biomacromolecules; 2008; pp. 3090-3097; vol. 9; American Chemical Society.

Fig: 12

ISOHEXIDE-DIACETAL BASED POLYMERS AND A PROCESS THEREOF

This application is a 35 U.S.C. 371 national stage filing and claims priority to PCT Application No. PCT/IN2014/000318, entitled "Isohexide-Diacetal Based Polymers and a Process Thereof" filed on May 9, 2014, which claims priority to Indian Application No. 1386/DEL/2013 filed on May 9, 2013, both of which are incorporated by reference herein in their entirety.

FIELD OF THE INVENTION

The present invention relates to isohexide-diacetal based polymers of Formula 1 of high molecular weight and a process thereof. Particularly, the present invention relates to isohexide based compounds and their polymers which are derived from renewable resources and are potentially degradable. More particularly, the present invention relates to isohexide based copolymers synthesized via copolymerization of isohexide based monomers and long chain diols, which are degradable.

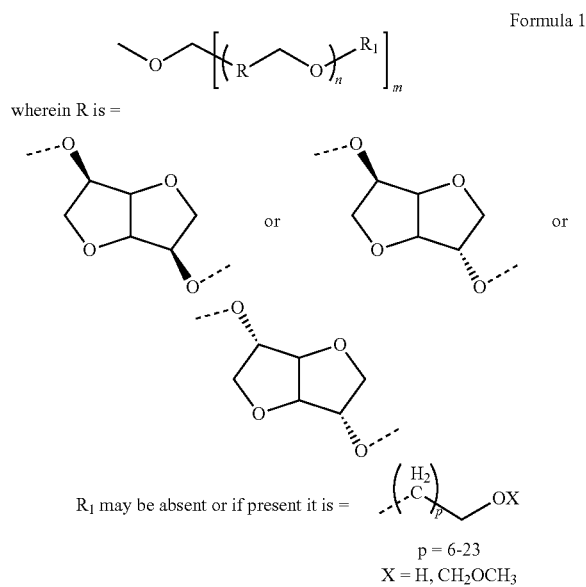

Formula 1 wherein the variable m ranges from 10-200.

BACKGROUND OF THE INVENTION

Last decade has seen a resurge in renewable resource based polymeric materials. Among the various renewable resources, sugars and plant oils provide direct entry to chemical modification and functionalization. Hence, sugars and plant oils are the most competitive candidates for further utilization in platform chemicals and polymerization. There are polymers that are renewable resource based, but do not degrade. Secondly, there are polymers which come from fossil fuels but degrade. However, there are hardly few, which come from renewables and are also degradable. Thus, degradability is another material requirement for clean and sustainable future.

Renewable resource based polyacetals seems to meet these two criteria. It has been found that oil based polyacetals undergo hydrolytic degradation. Despite this progress, sugar based acetal monomers have remain elusive and unexplored.

Isohexides derived from monomeric unit of carbohydrate which are non-toxic, have excellent structural rigidity are a promising surrogate for fossil fuel-derived diols. The exo-endo configuration of the hydroxyl groups further boosts the versatility of isosorbide leading to several applications in renewable chemicals, solvents, fuel, as chiral auxiliary.

Isohexide-acetals are now looked upon as decisive next generation of sustainable materials that would meet both the criteria viz. renewability and degradability thus contributing to green chemistry.

Furthermore, synthesis of acetal polymer and copolymer is challenging since polyacetals are sensitive to acid catalyzed hydrolytic cleavage.

In an Article titled, "Acetal metathesis polymerization (AMP): A method for Synthesizing biorenewable polyacetals" by Alexander G. Pemba, Jeniree A. Flores and Stephen A. Miller in *Green Chem.*, 2013, 15, 325-329 reports the synthesis of Polyalkylene acetals from simple bio-derived diols and diethoxymethane via a novel technique involving interchange of acetal functional groups. This Acetal Metathesis Polymerization (AMP) method provides a route to polyacetals that are designed to degrade under abiotic conditions via simple acid catalyzed hydrolysis.

Publication no. WO 2012/129070 A2 discloses a method of preparing a polyacetal comprising polymerization of a mixture comprising a plurality of at least one bis-acetal monomer in the presence of an acid catalyst that promotes the metathesis of the acetal units. The bis acetal can be formed from an acid catalysed exchange between a mono acetal monomers with a diol. It is further mentioned that formation of the bis-acetal and the polyacetal can be carried out simultaneously. Moreover, WO'070 mentions the use of C5 to C10 linear chain diols for preparation of acetals. Furthermore, the copolymers are obtained by reaction of long chain diols with diacetals.

In pursuit to present a new class of renewable and degradable polymers that can meet both the criteria of sustainable materials, the present invention is directed to provide sugar based monomers and polymers which are stable yet degradable under mild acidic conditions.

OBJECTS OF THE INVENTION

The main object of the present invention is to provide isohexide-diacetal based polymers of Formula 1 of medium to high molecular weight and a process thereof.

One more object of the present invention is to provide isohexide based compounds and their polymers which are derived from renewable resources and are potentially degradable.

Another object of the present invention is to provide a process for the synthesis of isohexide based monomers and polymers derived from renewable sources which are degradable.

Another object of the present invention is to provide a process for the synthesis of copolymers via copolymerization of isohexide based monomers and long chain diols, which are degradable.

SUMMARY OF THE INVENTION

Accordingly, the present invention provides isohexide-diacetal based polymer of Formula 1

Formula 1

[structure: $\ce{-O-CH2-[(R-O)_n-R1]_m}$ type formula]

wherein R is =

[three isohexide structures shown] or [another] or [another]

$R_1$ may be absent or if present it is = $-(CH_2)_p-O-X$ p = 6-23
X = H, CH₂OCH₃ wherein the variable m ranges from 10-200.

In one embodiment of the present invention, the isohexide-diacetal based polymer of Formula 1 is represented by the compounds of formulae I, II, and III;

I

[structure showing O-R-O with methyl groups]

wherein R is selected from the group consisting of isomannide, isosorbide and isoidide;

II

[structure showing repeating unit with n]

wherein R is selected from the group consisting of isomannide, isosorbide and isoidide;

III

[structure showing repeating unit with (CH₂)p and OH end group]

p = 6-23 wherein R is selected from the group consisting of isomannide, isosorbide and isoidide and the variable m ranges from 10-200.

In an embodiment of the present invention the isohexide-diacetal based polymer is represented by the group of the following compounds:

Isosorbide-diacetal

Isomannide-diacetal

Isoidide-diacetal poly2a

Polyisomannide-diacetal poly2b

Polyisosorbide-diacetal poly2c

Polyisoidide-diacetal

Copolymer of isomannide-diacetal monomer and C6 to C23 linear diol,

Copolymer of isosorbide-diacetal monomer and C6 to C23 linear diol, and

Copolymer of isoidide-diacetal monomer and C6 to C23 linear diol.

In another embodiment of the present invention a process for the synthesis of isohexide-diacetal based polymer of formula 1, wherein said process comprises the steps of:

a) suspending sodium hydride in dry tetrahydrofuran and adding slowly a THF solution of isohexide to the sodium hydride suspension over a period of 1-3 hours and stirring for 24-48 hours at room temperature ranging between 25-35° C. further adding chloromethyl methyl ether into it over 4-5 hours and stirring the reaction mixture for a period ranging between 24 to 48 hours to obtain isohexide-diacetal monomer of formula I;

b) heating isohexide-diacetal monomer of formula I as obtained in step (a) with 1-5 mol % $_p$TSA (p-toluene sulphonic acid) at temperature ranging between 60 to 100° C. which was raising from 90 to 140° C. over a period of 1-3 hours followed by shortly evacuating the reaction vessels after every 2-3 minute during the initial 2-3 hours to obtain a polymer melt and stirring the polymer melt over 3-7 hours at 90-140° C. under reduced pressure subsequently cooling and dissolving the solid in chloroform and re-precipitating from methanol to obtain isohexide-diacetal polymer of formula II;

c) optionally heating isohexide-diacetal monomer of formula I as obtained in step (a) with 1-5 mol % $_p$TSA (p-toluene sulphonic acid) and long chain diol at temperature ranging between 60 to 100° C. which was raising from 90 to 140° C. over a period of 1-3 hours followed by shortly evacuating the reaction vessels after every 2-3 minute during the initial 2-3 hours to obtain a polymer melt and stirring the polymer melt over 24-48 hours under reduced pressure to obtain copolymer of isohexide-diacetal with long chain diol of formula III.

In another embodiment of the present invention isohexide used in step (a) is selected from the group consisting of isomannide, isoidide and isosorbide.

In another embodiment of the present invention molecular weight of isohexide-diacetal based polymer of formula II is in the range of 3200-27600 g/mol.

In another embodiment of the present invention molecular weight of copolymer of isohexide-diacetal with long chain diol of formula III is in the range of 10000-30000 g/mol.

In another embodiment of the present invention yield of isohexide-diacetal based polymer of formula II is in the range of 46-71%.

In another embodiment of the present invention yield of copolymer of isohexide-diacetal with long chain diol of formula III is in the range of 97-99%.

BRIEF DESCRIPTION OF ACCOMPANYING DRAWINGS

FIG. 1: Depicts the HSQC spectrum for Isosorbide-diacetal

Figure 2:
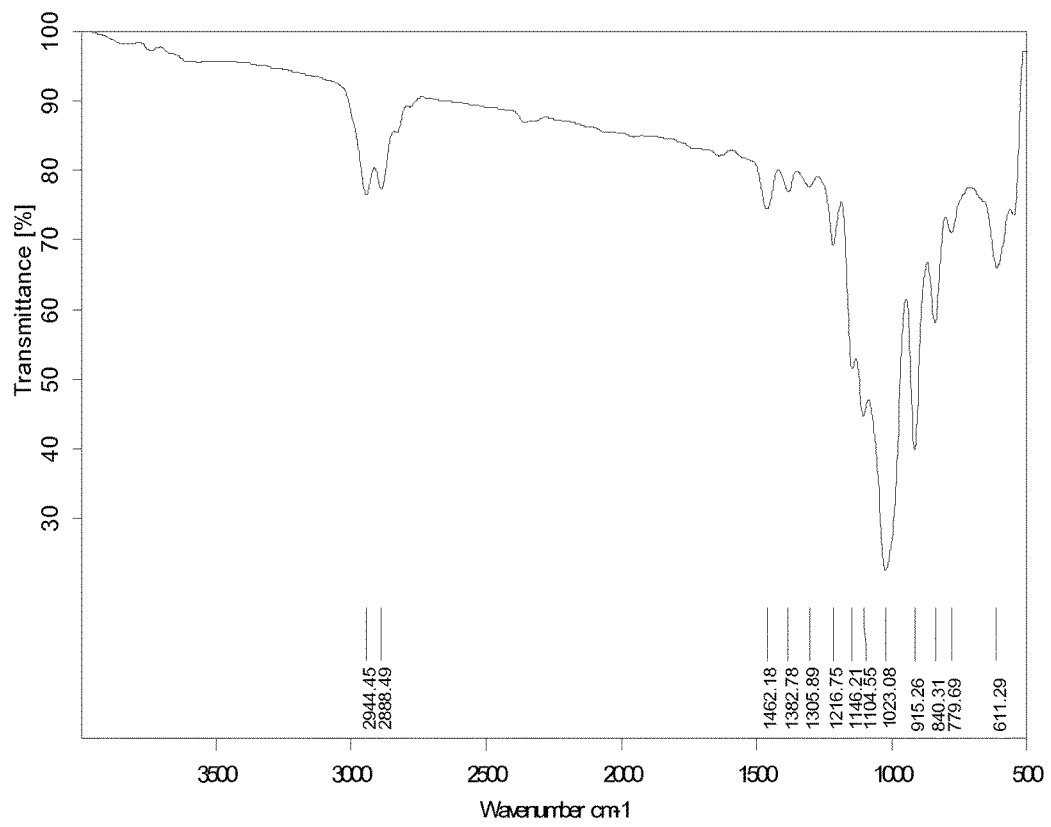

FIG. 2: Depicts the IR spectrum for Isosorbide-diacetal

Figure 3:
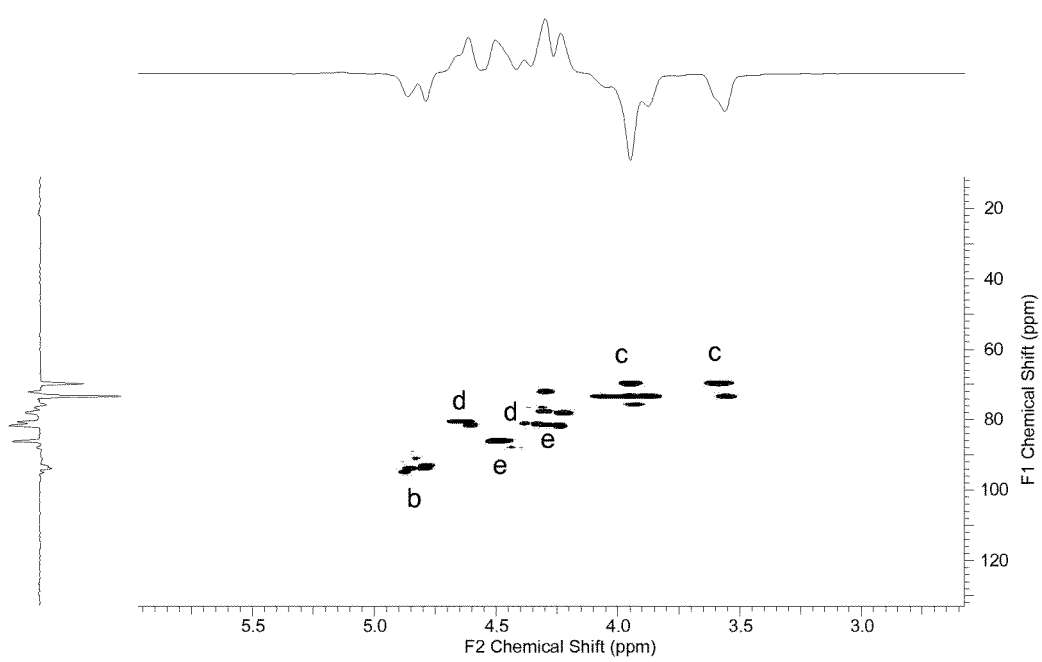

FIG. 3: Depicts the HSQC spectrum of Isosorbide-polyacetal

Figure 4:
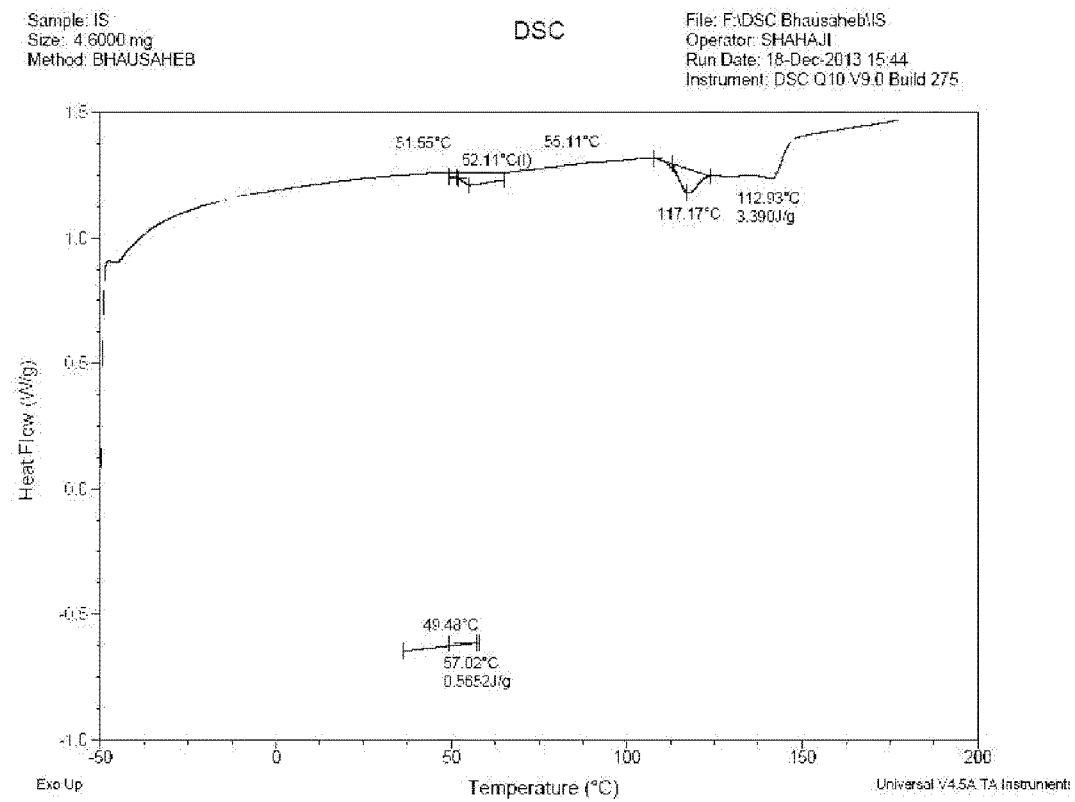

FIG. 4: Depicts the DSC spectrum of Isosorbide-polyacetal

Figure 5:
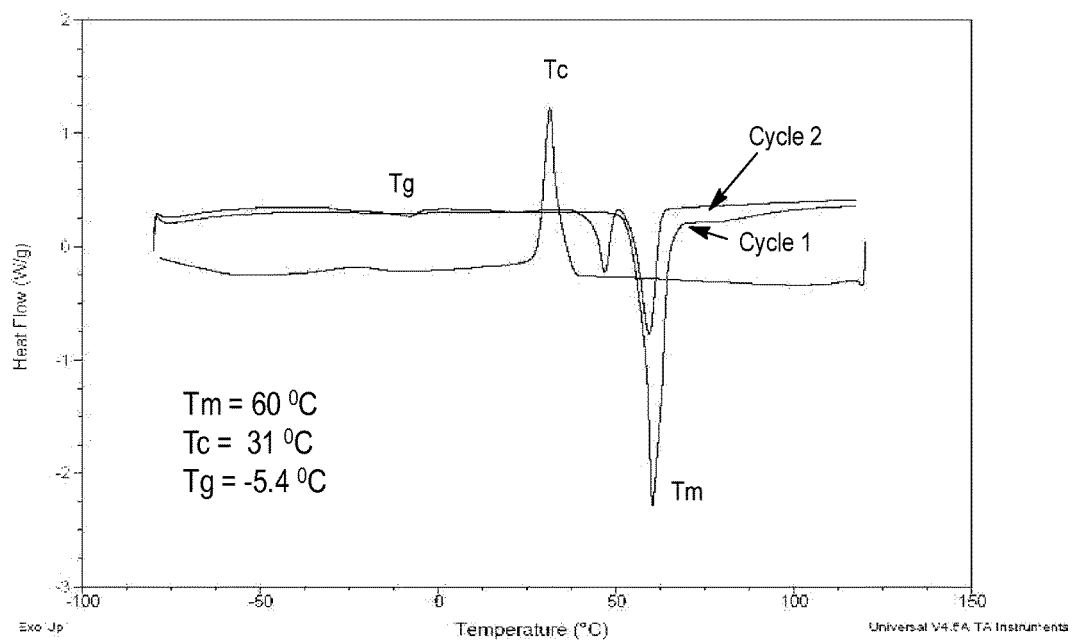

FIG. 5: Depicts the DSC spectrum of Isosorbide-copolymer

Figure 6:
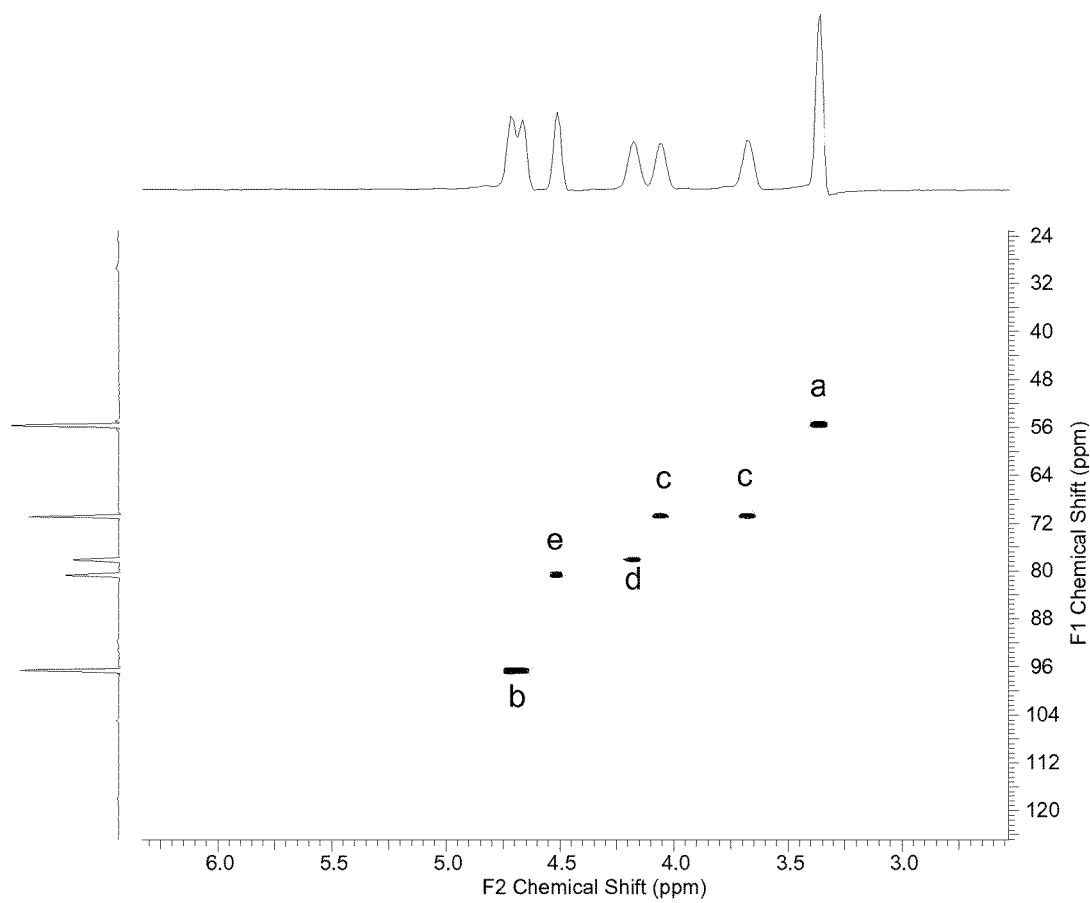

FIG. 6: Depicts the HSQC spectrum for Isomannide-diacetal

Figure 7:
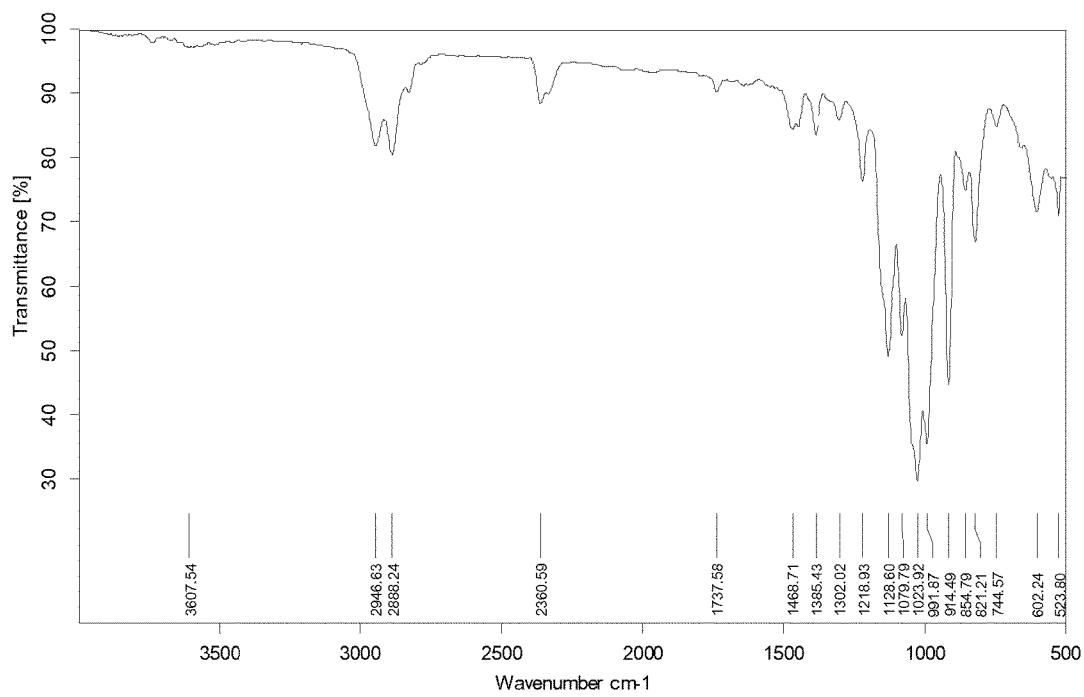

FIG. 7: Depicts the IR spectrum for Isomannide-diacetal

Figure 8:
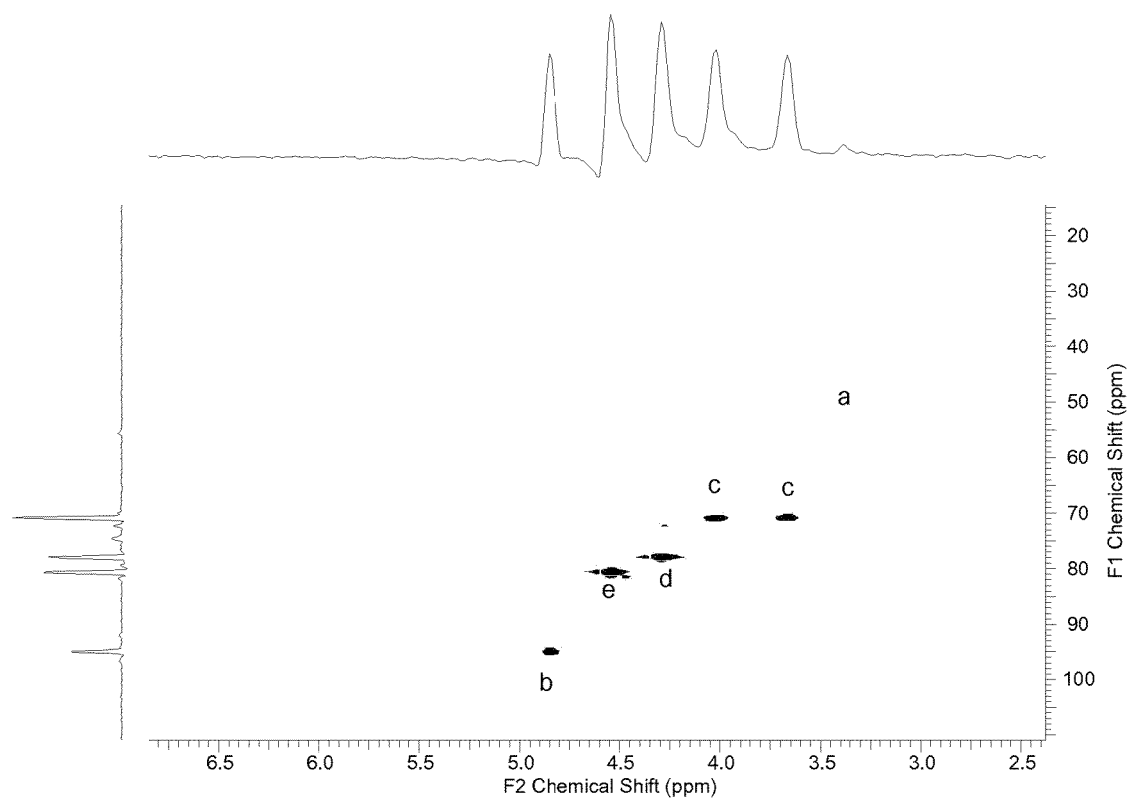

FIG. 8: Depicts the HSQC spectrum for Isomannide-polyacetal

Figure 9:
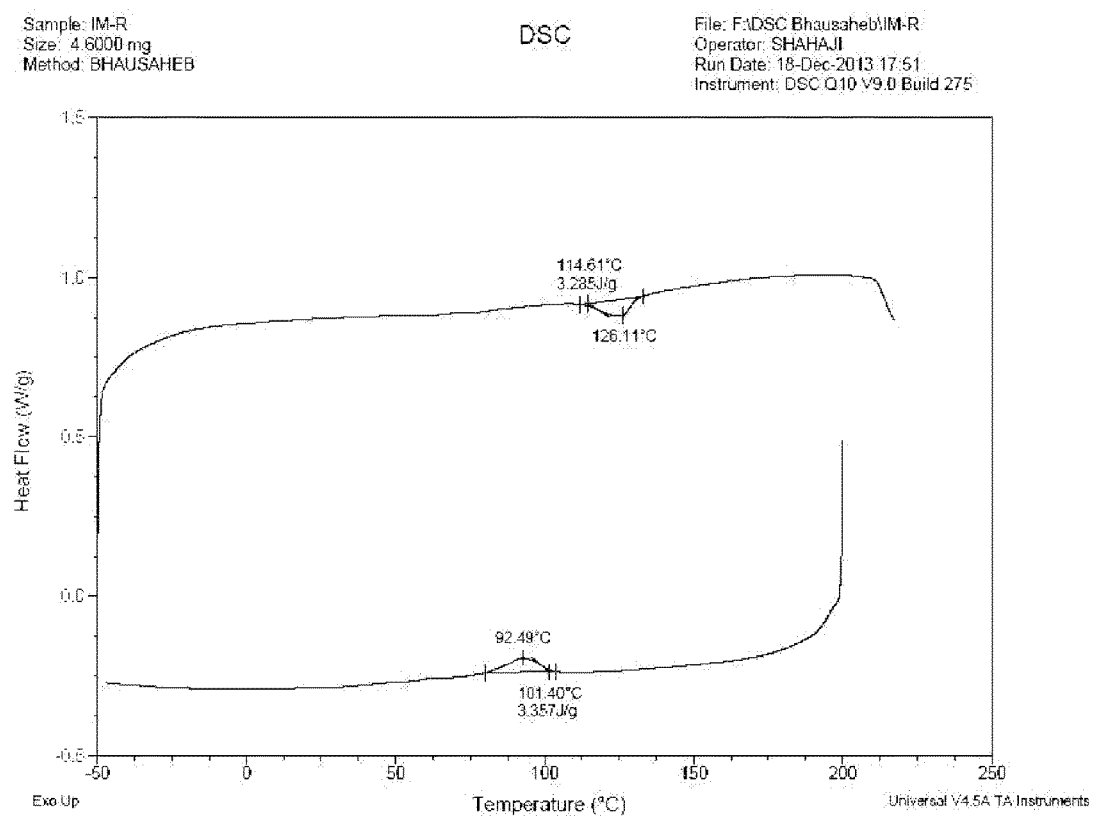

FIG. 9: Depicts the DSC spectrum for Isomannide-polyacetal

Figure 10:
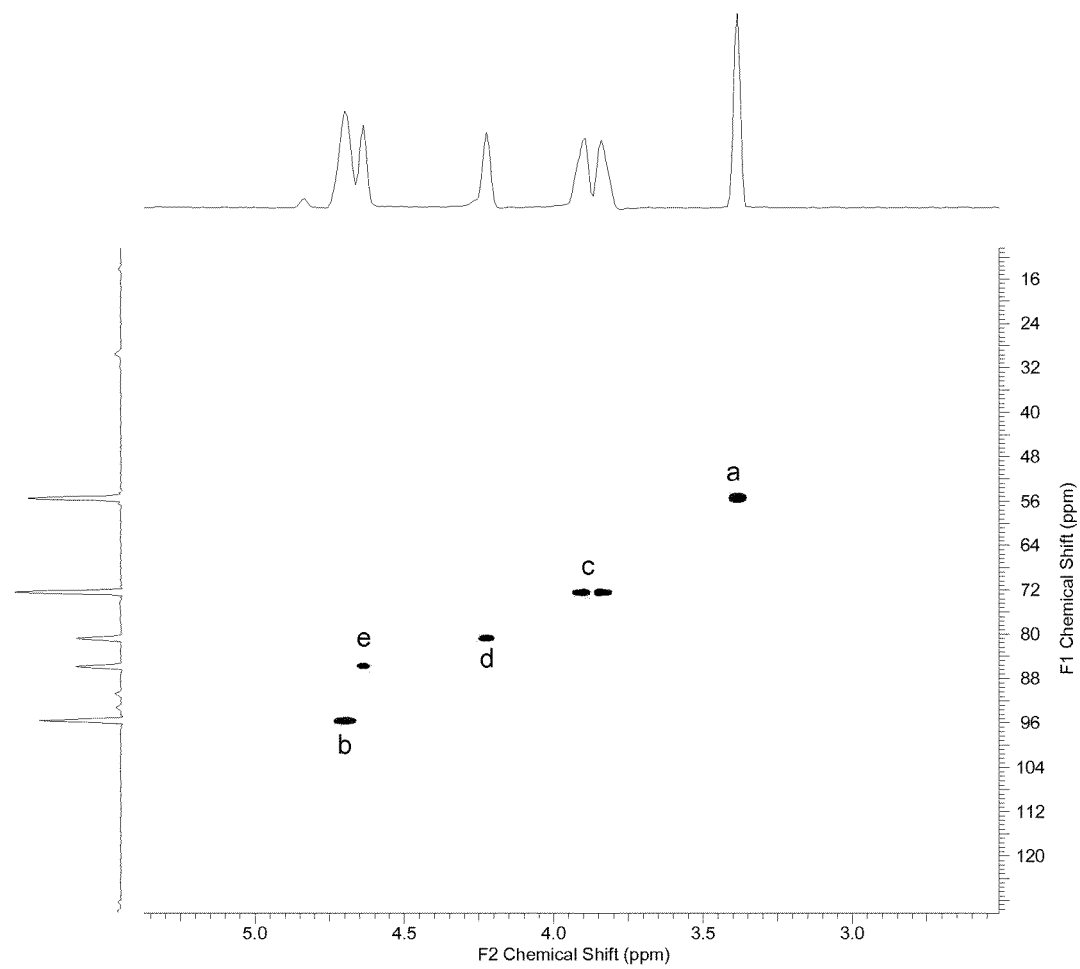

FIG. 10: Depicts the HSQC spectrum for Isoidide-diacetal

Figure 11:
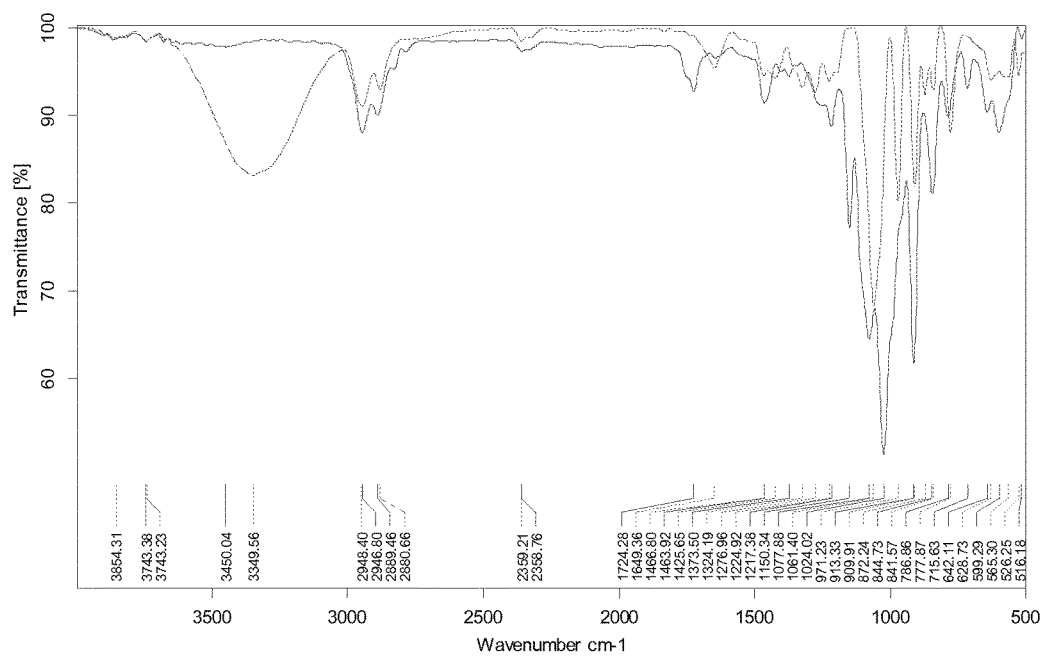

FIG. 11: Depicts the IR spectrum for Isoidide-diacetal (Overlap of diacetal (black) with diol (grey))

Figure 12:
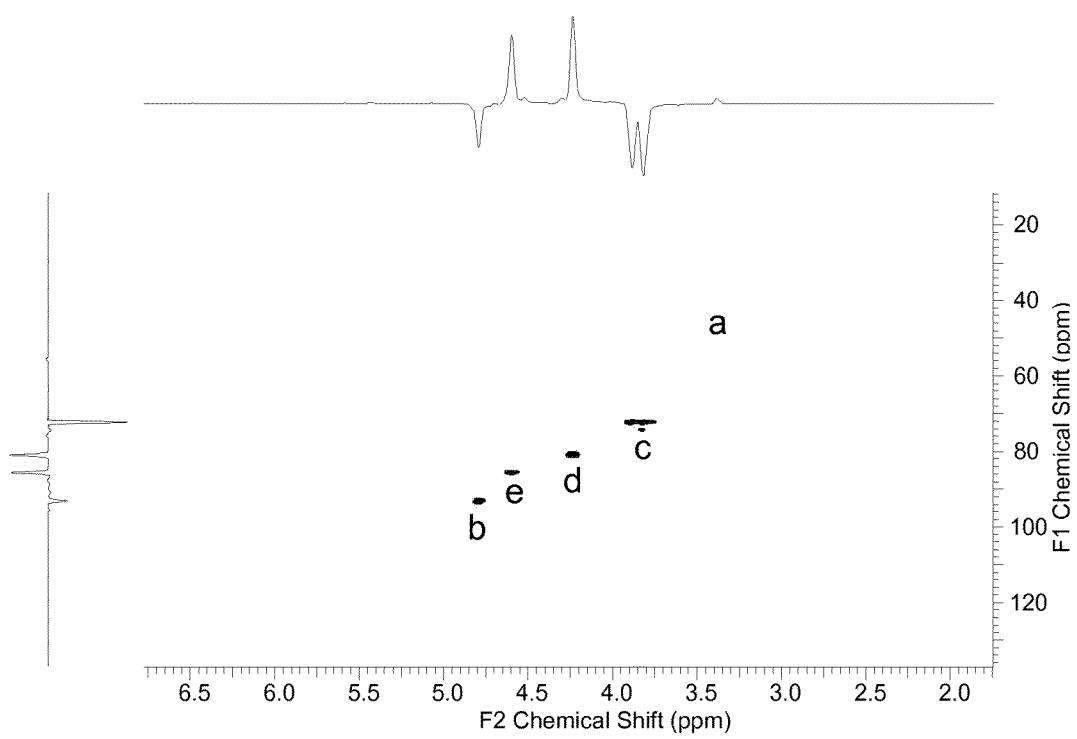

FIG. 12: Depicts the HSQC spectrum for Isoidide-polyacetal

Figure 13:
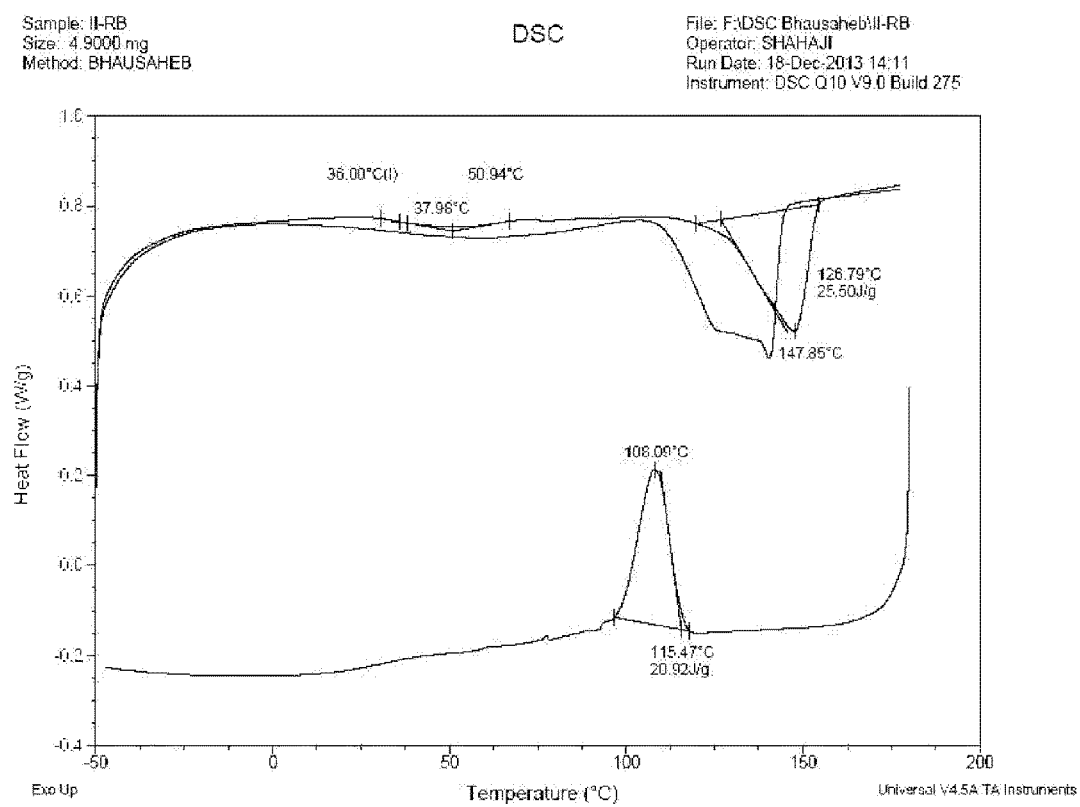

FIG. 13: Depicts the DSC spectrum for Isoidide-polyacetal

DETAILED DESCRIPTION OF THE INVENTION

The present invention provides biobased monomers derived from C-5 sugars such as isohexide that have excellent rigidity due to endo-exo configuration of the hydroxyl groups and polymers of isohexide based diacetals which are biorenewable as well as degradable.

The present invention provides isohexide based diacetal of formula I, with enhanced reactivity which is used to synthesize isohexide-diacetal polymer and copolymer stable toward washing and rinsing condition but degrade in slightly acidic media;

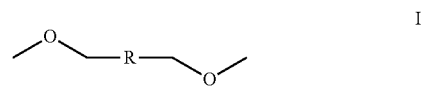

I wherein R is selected from the group consisting of isomannide (1a), isosorbide (1b) and isoidide (1c).

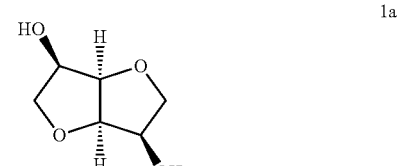

1a

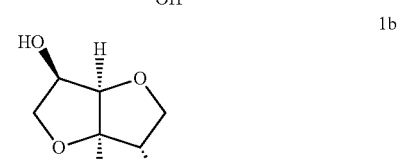

1b

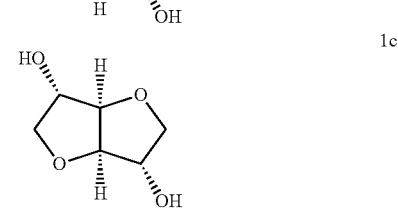

1c

Further, the present invention provides isohexide-diacetal based polymer of formula II of high molecular weight, which are potentially degradable;

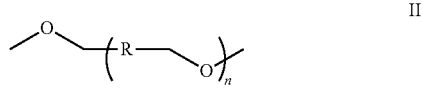

II wherein R is selected from the group consisting of isomannide, isosorbide and isoidide.

The present invention further provides copolymer of formula III;

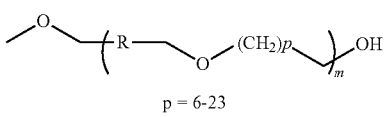

p = 6-23 wherein R is selected from the group consisting of isomannide, isosorbide and isoidide and the variable m ranges from 10-200.

The present invention also provides a process for preparation of copolymer of formula (III) comprising copolymerization of isohexide based monomers of formula (I) and C6 to C23 linear diols.

In an embodiment, the present invention provides isohexide based monomer compound of formula I

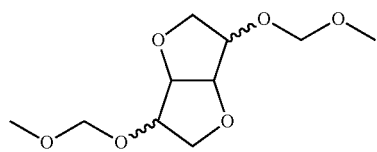

In an embodiment, the present invention provides isohexide based polymer compound of formula II

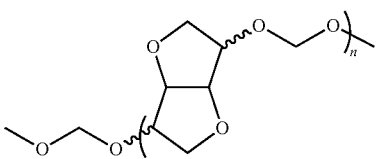

In an embodiment, the present invention provides isohexide based copolymer compound of formula III

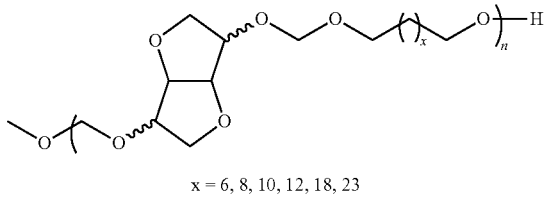

x = 6, 8, 10, 12, 18, 23

A process for the synthesis of isohexide based diacetal of formula I has also been provided in the present invention which comprises the steps of:
  a. Adding sodium hydride in dry tetrahydrofuran to obtain a suspension;
  b. Adding a THF solution of isohexide (1a to 1c) slowly to the suspension obtained in step (a) stirring to obtain a mixture;
  c. Adding ether compound to the mixture obtained in step (b) over 4-5 hours to obtain a reaction mixture and resultant reaction mixture stirred for 24 hours to obtain the desired product.

Sodium hydride was suspended in dry tetrahydrofuran. THF solution of isohexide (1a to 1c) was slowly added to the sodium hydride suspension over a period of 2-3 hours and stirred at room temperature over a period of 24 hours. To this mixture was added chloromethyl methyl ether over 4-5 hours and the resultant reaction mixture was stirred for 24 hours. Excess sodium hydride was quenched and the reaction mixture was washed with saturated sodium chloride solution and the aqueous phase was extracted with the ethyl acetate (3×30 ml). Combined organic phase was dried over $MgSO_4$, filtered and filtrate was evaporated in vacuum and purified to obtain isohexide-diacetal (2a to 2c) monomer along with traces of monoacetal side products (3a to 3c).

The isomannide and isosorbide, chloromethyl methyl ether and sodium hydride is used in the ratio ranging from 1:3:3. Whereas isoidide, chloromethyl methyl ether and sodium hydride is used in the ratio ranging from 1:5:5.

The process of synthesis of isohexide-diacetals is shown in Scheme 1 below.

Scheme 1

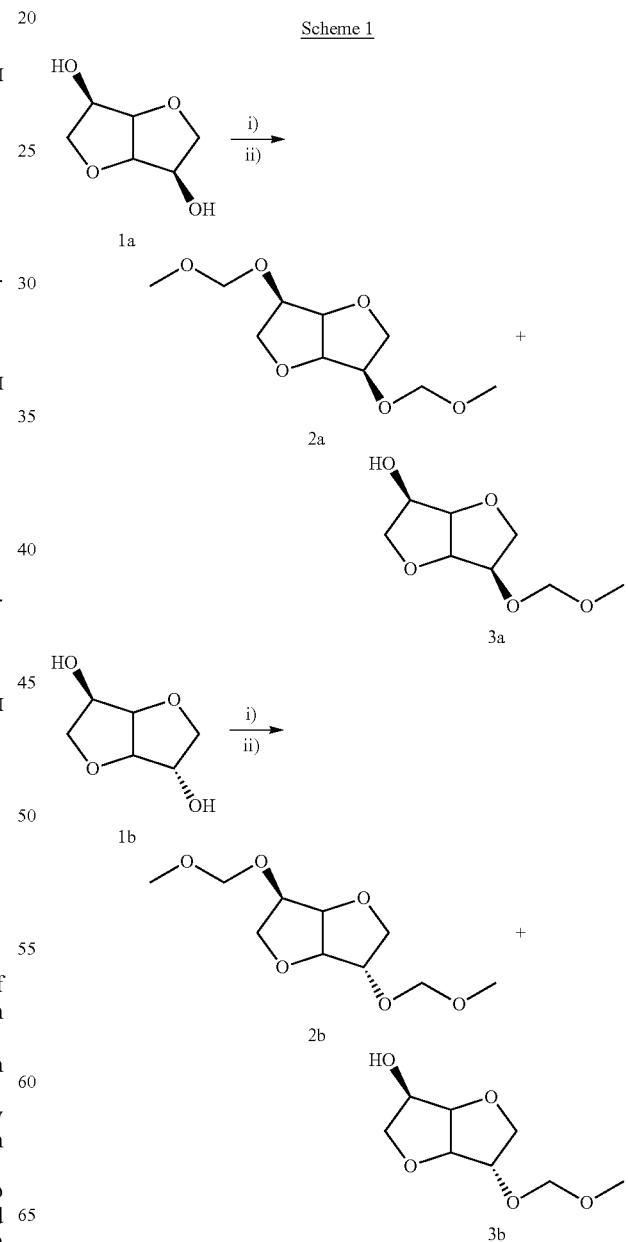

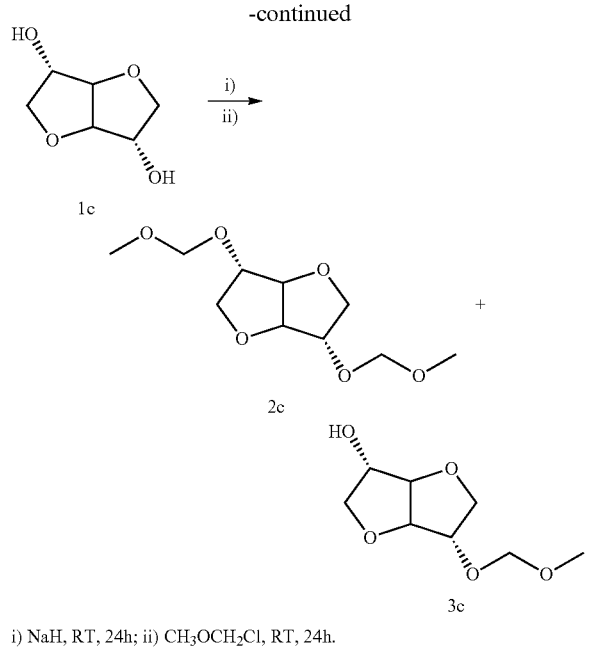

i) NaH, RT, 24h; ii) CH₃OCH₂Cl, RT, 24h.

The present invention provides a process for the synthesis of isohexide-diacetal based polymer of formula II comprising a) Adding an acid catalyst, p-toluene sulphonic acid (PTSA) to the isohexide -diacetal monomer (2a to 2c) in the reaction vessel, under constant inert gas flow to obtain a mixture;

b) Polymerizing the mixture by heating initially at 60° C. and raised to 90° C. over a period of about one hour followed by shortly evacuating the reaction vessels after 2 hours.

c) Subsequently, the polymerization was continued for next 3-7 hours under reduced pressure (0.01 mbar) at 90° C. afford the polymer, poly 2a to 2c in good yield.

The isohexide-diacetal monomers (2a to 2c) were polymerized using 2-5 mol % of para-Toulenesulfonic acid (p-TSA) as a catalyst in a schlenk tube that was equipped with high torque air-tight overhead mechanical stirrer. Typically, the polymerizations were started at 60° C. and temperature of the reaction vessel was slowly raised to 90° C. over a period of one hour. In the first 2 hours the reaction vessel was quickly evacuated after every 3 minutes to remove dimethoxymethane (byproduct). Subsequently, the polymerization was continued for next 3-7 hours under reduced pressure (0.01 mbar) at 90° C. The resultant highly viscous material was cooled and dissolved in chloroform, which was precipitated from methanol to give the desired polymers, poly 2a to 2c as white solids in excellent yield.

The polymerization reaction is depicted in Scheme 2 below:

Scheme 2

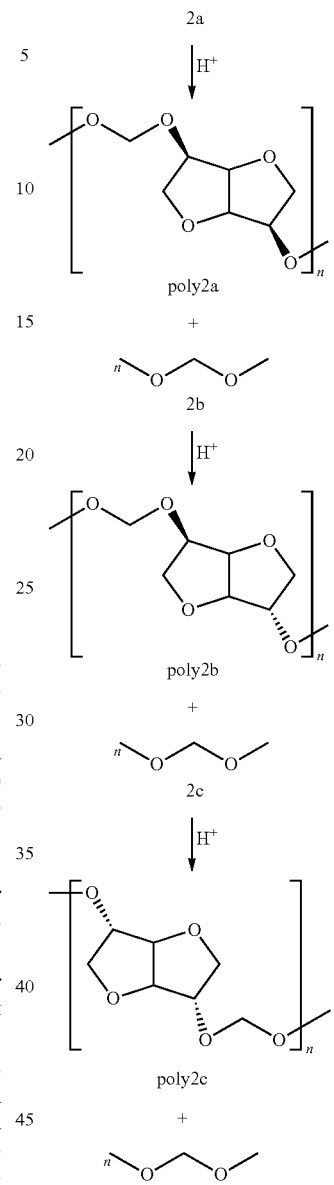

The isohexide-diacetal based polymer of formula II obtained have molecular weight in the range of 3200 to 27600 and melting temperature (Tm) above 100° C. The polymers were characterized by NMR and MALDI-Tof spectroscopy which are detailed herein below. Further, thermal behaviour of the polyacetals was investigated by differential scanning calorimetry (DSC) and thermogravimetric analysis (TGA) and the results are depicted in Table 1 below.

The molecular weight and thermal properties of isohexide-polyacetals is given in Table 1 below:

TABLE 1

| Polymers | Mn × 10³[a] | Mn × 10³[b] | Mw × 10³[b] | PDI[b] | $T_g$° C. | $T_m$° C. | Tc° C. |
|---|---|---|---|---|---|---|---|
| poly2a | 7.9 | 1.5 | 2.1 | 1.4 | 53.9 | 126.2 | 92.4 |
| poly2b | 27.6 | 4.4 | 8.9 | 2.0 | 52.1 | 117.3 | 49.5 |
| poly2c | 5.0 | 1.7 | 2.9 | 1.7 | 37.9 | 147.9 | 108.1 |

[a] Mn determined by NMR in g/mol. [b] Mn, Mw and polydispersity index (PDI) was obtained from GPC in chloroform solvent at room temperature with respect to polystyrene standards.

In the present invention a copolymer of formula (III) comprising isohexide-diacetal monomer (2a to 2c) and C6 to C23 linear diol has also been synthesized.

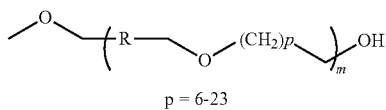

p = 6-23 wherein R is selected from the group consisting of isomannide, isosorbide and isoidide and the variable m ranges from 10-200. The copolymers of formula (III) were characterized by NMR and DSC.

In another embodiment, the present invention provides a process for the synthesis of isohexide-diacetal based copolymer of formula III with molecular weights >5000 by acid catalyzed copolymerization of isohexides-diacetal based monomer 2a to 2c and C6 to C23 linear diol.

Copolymerization of Isosorbide Diacetal with 1,12- Long Chain Diol

Copolymer was prepared in schlenk tube equipped with an overhead mechanical stirrer. Under the constant argon flow the monomer and 1,12-diol was transferred to the reaction vessel and p-Toluenesulphonic acid was added. The copolymerization was started by heating the mixture at 70° C. was raised to 100° C. over a period of one hour. During the initial 2 hours the reaction vessels was shortly evacuated after every 3 minute. Finally the copolymer melt was stirred over 24 hours under reduced pressure and the copolymer is recovered in good yield.

The process for the synthesis of sugar based co-polymers of formula III is shown below in scheme 4:

The present invention provides degradation study of the polyacetals, poly 2a to 2c. The highest molecular weight polyacetal (poly 2b) was chosen as the most relevant representative for degradation investigations. The poly 2b was stable towards practical washing ($D_2O$) and rinsing conditions, as the proton NMR of the washing displayed only solvent signal and no peaks corresponding to polyacetal could be detected.

However, a proton NMR of a poly 2b in $D_2O$ after 24 hours displayed poly 2b signals; although the intensity of the signals was very poor and the solid polymer could be seen in the NMR tube.

The degradation was accelerated by adding 0.1 ml of DCl (35% DCl in $D_2O$) to above NMR tube; however, the solid polymer was still visible. To enhance the degradation further, 0.1 of DCl was added to above NMR tube a spectrum was recorded after 12 hours. The proton NMR spectrum of the clear solution revealed sharp signals corresponding to the bicyclic skeleton and decreased intensity of the acetal (—$OCH_2O$—) fragment, indicating partial degradation of the polymer. The degradation was investigated also in organic media ($CDCl_3$) by acidifying the poly 2b solution with dilute hydrochloric acid (2M HCl in $Et_2O$). A time resolved proton NMR of this solution displayed a new signal at 5.4-5.5 ppm which grows in intensity over time.

The above experiments (in aqueous and organic media) suggested that the polyacetal degrades in slightly acidic media. Time resolved GPC analysis of the acid treated polymer revealed decrease in the molecular weight of the polymer with time further supporting the NMR findings.

The present invention provides a single step synthetic protocol to access a small family of polymers of isohexide-diacetals (poly 2a to 2c) derived from renewable isohexide-diacetal monomer (2a to 2c). The isohexide derived polyacetals are stable towards practical washing and rinsing conditions but degrade in slightly acidic media. The process can be extended to synthesize renewable chiral building blocks for pharmaceuticals and medicinal applications

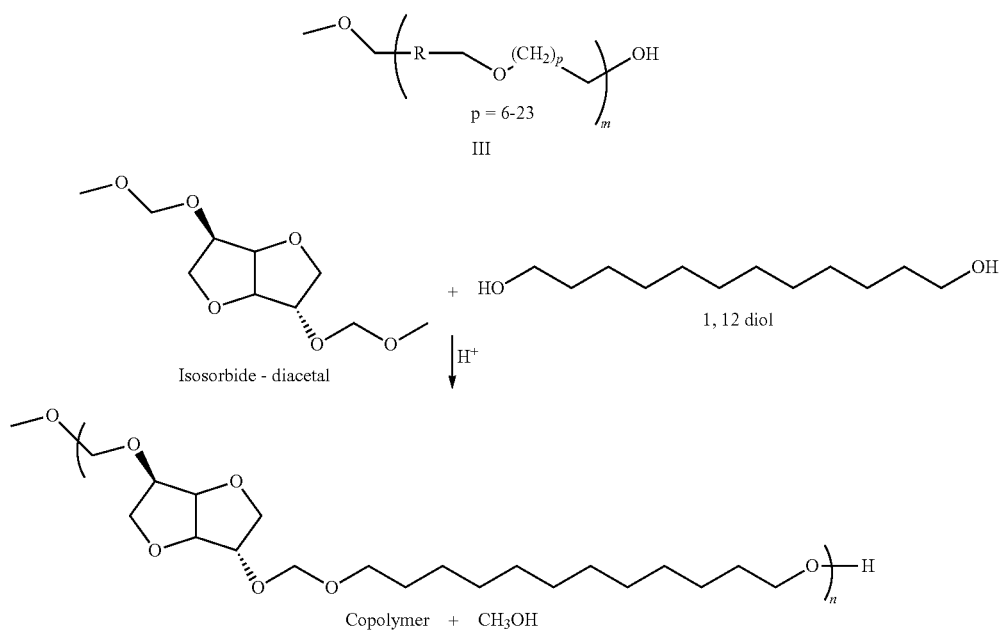

Scheme 4

EXAMPLES

The following examples are given by way of illustration of the working of invention in actual practice and should not be continued to limit the scope of present invention in any way.

Example 1

Synthesis of Isosorbide-diacetal Under Basic Condition 2.462 g (102.63 mmol) of sodium hydride was suspended in 50 ml dry tetrahydrofuran. A THF solution of isosorbide (5 g, 34.21 mmol in 50 ml THF) was slowly added to the sodium hydride suspension over a period of 2 hours and stirred for 24 hours at room temperature (35° C.). To this mixture was added chloromethyl methyl ether (7.80 ml, 102.63 mmol) over 4 hours and the resultant reaction mixture was stirred for 24 hours. Excess sodium hydride was quenched and the reaction mixture was washed with saturated sodium chloride solution and the aqueous phase was extracted with the ethyl acetate (3×30 ml). Combined organic phase was dried over $MgSO_4$, filtered and filtrate was evaporated in vacuum to obtain pale yellow oily liquid. Purification by column chromatography (hexane:ethyl acetate 75:25), yielded 5.9 g (25.22 mmol) of the desired diacetal 2b (74%).

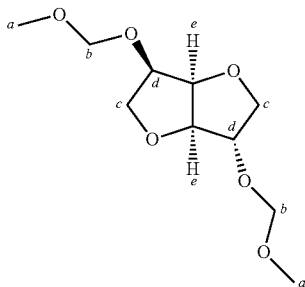

$^1$H NMR (500 MHz, $CDCl_3$, 298 K) δ=4.74-4.63 (dd, $J_{H-H}$=6.94 Hz, $4H_b$), 4.61-4.60 (m, $1H_e$), 4.50 (m, $1H_d$), 4.18-4.16 (m, $1H_e$), 4.16-4.14 (m, $1H_d$), 3.96-3.92 (m, $3H_c$), 3.57-3.53 (m, $1H_c$), 3.37 (s, $3H_a$), 3.34 (s, $3H_a$); $^{13}$C NMR (500 MHz, $CDCl_3$, 298 K) δ=96.6 (s, $C_b$), 95.6 (s, $C_b$), 86.2 (s, $C_e$), 81.6 (s, $C_d$), 80.8 (s, $C_e$), 77.9 (s, $C_d$), 73.7 (s, $C_c$), 69.6 (s, $C_c$), 55.7 (s, $C_a$), 55.5 (s, $C_a$); ESI-MS (Positive mode) m/z=257.09 [M+Na]$^+$; Elemental analysis (%) calculated for $C_{10}H_{18}O_6$: C-51.23%, H-7.69%; Found: C-50.95%, H-7.84%, IR ($C_{10}H_{18}O_6$) cm$^{-1}$: 1146, 1104 (C—H/C—O stretching).

Optimization of Isosorbide-Diacetal
Conditions: Run (1) 5 g. Isosorbide, Chloromethyl methyl ether & Sodium Hydride (1:3:3) Equivalent, THF Room temperature under argon.
Run (2) 5 g. Isosorbide, Chloromethyl methyl ether & Sodium Hydride (1:3:3) Equivalent, THF Room temperature under argon.

TABLE 2

| Run | Base | Time(h) | Di % | Mono % |
|---|---|---|---|---|
| 1 | NaH (1:2) Equivalent | 48 | 58 | 3 |
| 2 | NaH (1:3) Equivalent | 48 | 74 | 2 |

Example 2

Synthesis of Isosorbide-monoacetal Under Acidic Condition

To a tetrahydrofuran suspension (10 ml) of isosorbide (1 g; 6.84 mmol) was added dimethoxymethane (10 ml) and methane sulphonic acid (1.33 ml; 20.52 mmol; 3 equivalent), and the mixture was stirred over night (16 hours) at room temperature (35° C.) to give a clear solution. Subsequently, the reaction was quenched by adding ammonium hydroxide solution (1.33 ml, 30% solution), followed by washing with saturated solution of NaCl (20 ml). The aqueous phase was extracted with ethyl acetate (3×30 ml) and combined organic phase was dried over $MgSO_4$, filtered and filtrate evaporated to obtain a pale yellow oily liquid. Purification by column chromatography (hexane:ethyl acetate 75:25), yielded (0.382 g; 1.63 mmol), 24% of monoacetal and (0.368 g; 1.60 mmol), 23% of diacetal. The spectrum of the major product (i.e. monoacetal) 3b is given below.

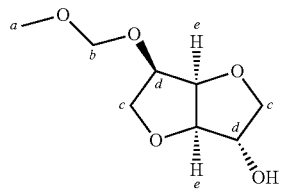

$^1$H NMR (400 MHz, $CDCl_3$, 298 K) δ=4.66-4.62 (dd, $J_{H-H}$=6.75 Hz, $2H_b$), 4.56-4.55 (m, $1H_e$), 4.45-4.43 (m, $1H_d$), 4.24-4.21 (m, $2H_{e,d}$), 4.01-3.98 (m, $1H_c$), 3.86-3.80 (m, $2H_c$), 3.52-3.48 (m, $1H_c$), 3.33 (s, $3H_a$), 2.86 (broad peak —OH, 1H). $^{13}$C NMR (400 MHz, $CDCl_3$, 298K) δ=95.5 (s, $C_b$), 86.2 (s, $C_e$), 81.7 (s, $C_d$), 81.3 (s, $C_e$), 73.6 (s, $C_c$), 73.3 (s, $C_c$), 72.2 (s, $C_d$), 55.5 (s, $C_a$). ESI-MS (+ve) cal. m/z=213.07 [M+Na]$^+$; Obs. m/z=213.07 [M+Na]$^+$; Elemental analysis (%) calculated for $C_8H_{14}O_5$ (190.09): C-50.51%, H-7.36%; Found : C-50.07%, H-7.67%.

Reaction Conditions: 2 g Isosorbide, THF: Dimethoxymethane-1:1 (15 ml),

Room Temperature, Open Atmosphere

TABLE 3

| Run | Catalyst (mol %) | Time (h) | Mono (%) | Di (%) |
|---|---|---|---|---|
| 1 | MSA (20) | 24 | 25 | 16 |
| 2 | MSA (40) | 24 | 28 | 19 |
| 3 | Trifluro-MSA (10) | 48 | 19 | 16 |
| 4 | Trifluro-MSA (20) | 48 | 32 | 19 |

Reaction Conditions: 1 g. Isosorbide, THF: Dimethoxymethane-1:1 (15 ml),

Room Temperature, Open Atmosphere

TABLE 4

| Run | Catalyst | Time (h) | 2 (%) | 1 (%) |
|---|---|---|---|---|
| 1 | MSA (1:1) Equivalent | 48 | 20 | 19 |
| 2 | MSA (1:2.1) Equivalent | 48 | 24 | 23 |
| 3 | MSA (1:3) Equivalent | 48 | 24 | 23 |

Example 3

Synthesis of Isomannide-diacetal 0.98 g (41.04 mmol) of sodium hydride was suspended in 20 ml dry tetrahydrofuran. A THF solution of isomannide (2 g, 13.68 mmol in 30 ml THF) was slowly added to the sodium hydride suspension over a period of 2 hours and stirred for 24 hours at room temperature (35° C.). To this mixture was added chloromethyl methyl ether (3.12 ml, 41.04 mmol) over 4 hours and the resultant reaction mixture was stirred for 24 hours. Excess sodium hydride was quenched and the reaction mixture was washed with saturated sodium chloride solution and the aqueous phase was extracted with the ethyl acetate (3×20 ml). Combined organic phase was dried over $MgSO_4$, filtered and filtrate was evaporated in vacuum to obtain pale yellow oily liquid. Purification by column chromatography (hexane:ethyl acetate 75:25) yielded 2.129 g (9.1 mmol) of the desired diacetal 2a (67%).

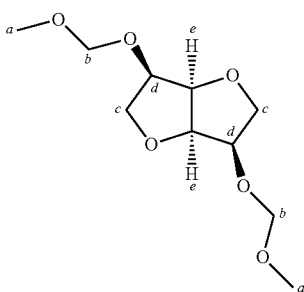

$^1$H NMR (200 MHz, $CDCl_3$, 298 K) δ=4.71-4.61 (dd, $J_{H-H}$=6.68 Hz, 4H$_b$), 4.50-4.45 (m, 2H$_e$), 4.20-4.10 (m, 2H$_d$), 4.06-3.98 (m, 2H$_c$), 3.69-3.60 (m, 2H$_c$), 3.33 (s, 6H$_a$); $^{13}$C NMR (400 MHz, $CDCl_3$, 296 K) δ=96.64 (s, C$_b$), 80.80 (s, C$_e$), 78.25 (s, C$_d$), 70.91 (s, C$_c$), 55.72 (s, C$_a$). ESI-MS (Positive mode) m/z=257.09 [M+Na]$^+$; Elemental analysis (%) calculated for $C_{10}H_{18}O_6$: C-51.23%, H-7.69%; Found: C-51.01%, H-7.92%, IR ($C_{10}H_{18}O_6$) cm$^{-1}$=1128, 1080 (C—H/C—O stretching).

Example 4

Synthesis of Isoidide-diacetal 1.92 g (80.16 mmol) of sodium hydride was suspended in 30 ml dry tetrahydrofuran. A THF solution of isoidide (2.34 g, 16.03 mmol in 30 mL THF) was slowly added to the sodium hydride suspension over a period of 2 hours and stirred for another 24 hours at room temperature (35° C.). To this mixture was added chloromethyl methyl ether (6.08 ml, 80.16 mmol) over 4 hours and the resultant reaction mixture was stirred for 24 hours. Excess sodium hydride was quenched with minimum amount of distilled water (approx. 1 ml) and the reaction mixture was filtered, dried over $MgSO_4$ and the volatiles were evaporated. The resultant residue (greenish oily liquid) was purified by column chromatography (hexane:ethyl acetate 75:25), yielded 3.10 g (13.23 mmol) of the desired diacetal 2c (83%).

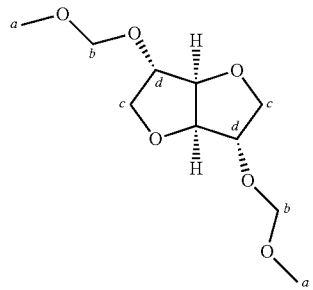

$^1$H NMR (400 MHz, $CDCl_3$, 298 K) δ=4.71-4.65 (dd, 4H$_b$), 4.62 (m, 2H$_e$), 4.20 (m, 2H$_d$), 3.90-3.79 (m, 4H$_c$), 3.36 (s, 6H$_a$; $^{13}$C NMR (400 MHz, $CDCl_3$, 298 K) δ=95.6 (s, C$_b$), 85.9 (s, C$_e$), 80.8 (s, C$_d$), 72.5 (s, C$_c$), 55.5 (s, C$_a$). ESI-MS (+ve mode) m/z=257.1 [M+Na]$^+$; Elemental analysis (%) calculated for $C_{10}H_{18}O_6$: C-51.23, H-7.69; Found: C-51.51, H-8.35, IR ($C_{10}H_{18}O_6$) cm$^{-1}$ 1150, 1078.

Example 5

Polymerization of Isomannide-diacetal

The polymerization was run in a 70 ml Schlenk tube equipped with air-tight high torque overhead mechanical stirrer. The polymer was prepared by heating neat 2a (2.15 g 9.18 mmol) with 2 mol % $_p$TSA (0.034 g, 0.18 mmol) at 60° C. which was raised to 90° C. over a period of one hour. The byproduct (dimethoxymethane) was continuously removed on vacuum. After 2 hours a solid mass was observed. The polymerization was terminated after 3 hours, the vessel was cooled down and the solid polymer was dissolved in minimum amount of chloroform (approx. 2 ml). Re-precipitation from methanol produced 1 g (6.32 mmol) of a white solid material (69% yield).

$^1$H NMR (400 MHz, $CDCl_3$, 298 K) δ=4.84-4.83 (m, 94H$_b$), 4.54-4.51 (m, 103H$_e$), 4.28-4.25 (m, 102H$_d$), 4.05-3.93 (m, 105H$_c$), 3.67-3.61 (m, 101H$_c$), 3.37 (s, 6H$_a$). $^{13}$C NMR (400 MHz, $CDCl_3$, 298 K) δ=96.0-95.0 (s, C$_b$), 81.6-80.7 (s, C$_e$), 78.1-77.9 (s, C$_d$), 74.6 (s, C$_c$), 72.3 (s, C$_d$) 70.9 (s, C$_c$), 55.7 (s, C$_a$).

Example 6

Polymerization of Isosorbide-diacetal

The polymerization was run in a 70 ml schlenk tube equipped with air-tight high torque overhead mechanical stirrer. The polymer was prepared by heating neat 2b (4 g, 17.07 mmol) with 5 mol % $_p$TSA (0.16 g, 0.85 mmol) at 60° C. which was raised to 90° C. over a period of two hours. The byproduct (dimethoxymethane) was continuously removed on vacuum. The polymerization was terminated after 7 hours, the vessel was cooled down and the solid polymer was dissolved in minimum amount of chloroform (approx. 2 ml). Re-precipitation from methanol produced 1.92 g (12.15 mmol) of a white solid material (71% yield).

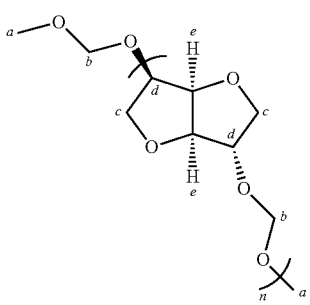

$^1$H NMR (400 MHz, CDCl$_3$, 298 K) δ=4.85-4.70 (m, 331H$_b$), 4.62-4.59 (m, 182H$_e$), 4.46-4.40 (m, 174H$_d$), 4.30-4.17 (m, 342H$_{e,d}$), 3.95 -3.92 (m, 525H$_c$), 3.60-3.52 (m, 174H$_c$), 3.38-3.34 (s, 6H$_a$). $^{13}$C NMR (400 MHz, CDCl$_3$, 298 K) δ=94.9-93.3 (s ,C$_b$), 88.0 (s, C$_e$), 86.2-86.1 (s, C$_d$), 81.9-80.7 (s, C$_e$), 78.2-78.0 (s, C$_d$), 73.4 (s, C$_c$), 69.8 (s, C$_c$).

Example 7

Polymerization of Isoidide-diacetal

The polymerization was carried out in a 70 ml Schlenk tube equipped with air-tight high torque overhead mechanical stirrer. The polymer was prepared by heating neat 2c (0.91 g, 3.88 mmol) with 5 mol % $_p$TSA (0.037 g, 0.194 mmol) at 60° C. which was raised to 90° C. over a period of one hour. The byproduct (dimethoxymethane) was continuously removed on vacuum. After 2 hours a solid mass was observed. The polymerization was terminated after 3 hours, the vessel was cooled down and the solid polymer was dissolved in minimum amount of chloroform (approx. 1 ml). Re-precipitation from methanol produced 0.35 g (2.2 mmol) of a white solid material (58% yield).

$^1$H NMR (500 MHz, CDCl$_3$, 298 K) δ=4.80-4.57 (m, 130H$_{b,e}$), 4.28-4.21 (m, 61H$_d$), 3.87-3.80 (m, 127H$_c$), 3.36 (s, 6H$_a$). $^{13}$C NMR (500 MHz, CDCl$_3$, 298 K) δ=95.6-93.1 (s, C$_b$), 87.6-85.7 (s, C$_e$), 80.9 (s, C$_d$), 74.4 (s, C$_c$), 72.37 (s, C$_d$), 72.30 (s, C$_c$), 55.6 (s, C$_a$).

TABLE 6

Molecular weight thermal properties and isolated yields of isohexides-polyacetals

| Run | M$_n$ × 10$^{3[b]}$ | M$_n$ × 10$^{3[c]}$ | M$_w$ × 10$^{3[c]}$ | PDI$^{[c]}$ | T$_g$° C. | T$_m$° C. | T$_c$° C. | Yield in g (Theoretical) | Yield in g (Isolated) |
|---|---|---|---|---|---|---|---|---|---|
| P2a-1 | 7.9 | 1.5 | 2.1 | 1.4 | 53. | 126.2 | 92.4 | 1.45 | 1.0 |
| P2a-2$^x$ | 8.4 | 2.3 | 3.8 | 1.6 | 65. | 130.4 | 86.9 | 0.67 | 0.46 |
| P2a-3$^x$ | 4.4 | 2.3 | 3.6 | 1.5 | — | — | — | 1.35 | 1.16 |
| P2b-1$^x$ | 4.9 | 3.0 | 5.0 | 1.6 | — | — | — | 1.36 | 0.53 |
| P2b-2 | 27.6 | 4.4 | 8.9 | 2.0 | 52. | 117.3 | 49.5 | 2.70 | 1.92 |
| P2b-3$^x$ | 16.9 | 3.7 | 7.5 | 2.0 | 58. | 103.2 | 56.2 | 0.95 | 0.20 |
| P2c-1 | 5.0 | 1.7 | 2.9 | 1.7 | 37. | 147.9 | 108.1 | 0.62 | 0.36 |
| P2c-2$^x$ | 3.2 | 1.8 | 2.8 | 1.5 | — | — | — | 1.01 | 0.64 |
| P2c-3$^x$ | 16.0 | 2.1 | 3.7 | 1.7 | 51.8 | 156.4 | 121.5 | 0.89 | 0.56 |

Example 8

Copolymerization of Isosorbide-diacetal with Long Chain Diol

Copolymer was prepared in a 50 ml schlenk tube equipped with an overhead mechanical stirrer. Under the constant argon flow the monomer (2 g, 8.54 mmol) and 1,12-diol (1.72 g, 8.54 mmol) was transferred to the reaction vessel and p-Toluenesulphonic acid (0.08 gm, 0.16 mmol, 10 mol %) was added. The copolymerization was started by heating the mixture at 70° C. was raised to 100° C. over a period of one hour. During the initial 2 hours the reaction vessels was shortly evacuated after every 3 minute. Finally the copolymer melt was stirred over 24 hours under reduced pressure (0.01 mbar), and the copolymer is recovered in good yield 99%.

$^1$H NMR (400 MHz, CDCl$_3$, 296 K) δ=4.77-4.58 (m, 60H), 4.45-4.20 (m,65H), 4.01-3.82 (m,45H), 3.61-3.47 (m, 79), 1.56-1.24 (m,352H)

ADVANTAGES OF THE INVENTION a. Synthesis of degradable polyacetals derived from renewable resources.
b. Synthesis of Isohexide-diacetal in excellent yields.
c. Condensation polymerization of Isohexide-diacetal with Mw of 3200-27600 was performed.
d. Copolymerization of isosorbide-diacetal with 1,12 dodecanediol led to a copolymer of Mw>5,000.
e. Polymers can be used in packaging, drug delivery and biomed applications.

We claim:

1. An isohexide-diacetal based polymer having a molecular weight between 3,200 and 27,600 g/mol, comprising Formula 1

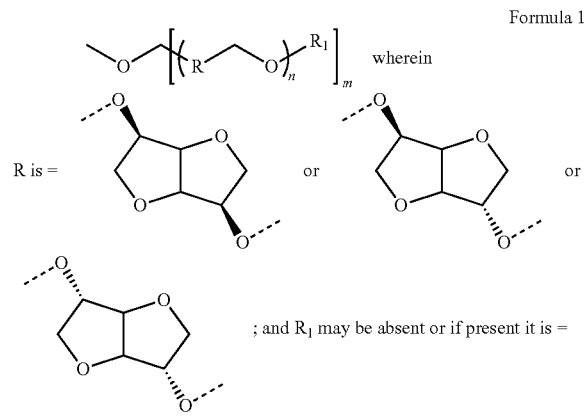

-continued $\left(\begin{array}{c}H_2\\C\end{array}\right)_p$ OX p = 6-23
x = H, CH$_2$OCH$_3$ wherein m ranges from 10-200.

2. The isohexide-diacetal based polymer of Formula 1 as claimed in claim 1, wherein the Isohexide-diacetal based polymer of Formula 1 is represented by the compounds of formulae I, II, and III;

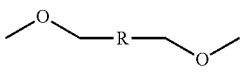

(I)

wherein R is selected from the group consisting of iso-mannide, isosorbide and isoidide;

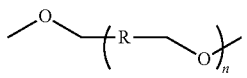

(II)

wherein R is selected from the group consisting of iso-mannide, isosorbide and isoidide;

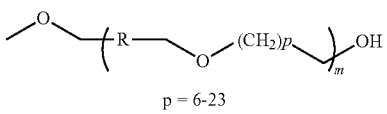

p = 6-23

(III)

wherein R is selected from the group consisting of iso-mannide, isosorbide and isoidide and the variable m ranges from 10-200.

3. The isohexide-diacetal based polymer of Formula 1 as claimed in claim 2 is represented by the group of the following compounds:

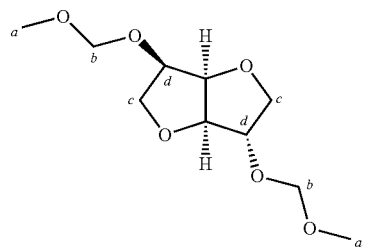

Isosorbide-diacetal

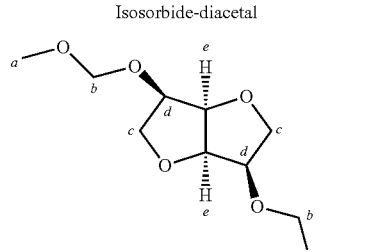

Isomannide-diacetal

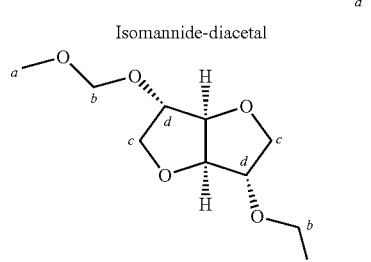

Isoidide-diacetal

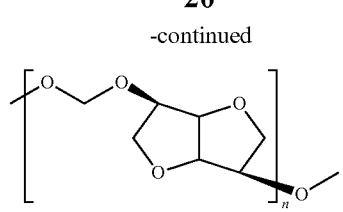

Polyisomannide-diacetal (poly2a)

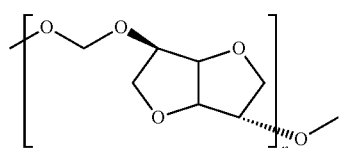

Polyisosorbide-diacetal (poly2b)

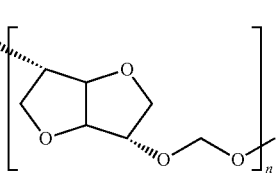

Polyisoidide-diacetal (poly2c)

Copolymer of isomannide-diacetal monomer and C6 to C23 linear diol,
Copolymer of isosorbide-diacetal monomer and C6 to C23 linear diol, and
Copolymer of isoidide-diacetal monomer and C6 C23 linear diol.

4. A process for the synthesis of isohexide-diacetal based polymer of formula 1 as claimed in claim 1, wherein said process comprises the steps of:

a) suspending sodium hydride in dry tetrahydrofuran to form a sodium hydride suspension; adding slowly a THF solution of isohexide to the sodium hydride suspension over a period of 1-3 hours and stirring for 24-48 hours at room temperature ranging between 25-35° C. to form a first mixture; adding chloromethyl methyl ether to the mixture over 4-5 hours to form a second mixture and stirring the second mixture for a period ranging between 24 to 48 hours to obtain the isohexide-diacetal monomer of formula I;

b) heating isohexide-diacetal monomer of formula I as obtained in step (a) with 1-5 mol % $_p$TSA (p-toluene sulphonic acid) at a beginning temperature ranging between 60 to 100° C. and raising the temperature to between 90 to 140° C. over a period of 1-3 hours followed by shortly evacuating the reaction vessels after every 2-3 minute during the initial 2-3 hours to obtain a polymer melt and stirring the polymer melt over 3-7 hours at 90-140° C. under reduced pressure subsequently cooling and dissolving the solid in chloroform and re-precipitating from methanol to obtain isohexide-diacetal polymer of formula II;

c) optionally heating isohexide-diacetal monomer of formula I as obtained in step (a) with 1-5 mol % $_p$TSA (p-toluene sulphonic acid) and long chain diol at temperature ranging between 60 to 100° C. which was raising from 90 to 140° C. over a period of 1-3 hours followed by shortly evacuating the reaction vessels after every 2-3 minute during the initial 2-3 hours to obtain a polymer melt and stirring the polymer melt over 24-48 hours under reduced pressure to obtain copolymer of isohexide-diacetal with long chain diol of formula III.

5. The process as claimed in claim 4, wherein the isohexide used in step (a) is selected from the group consisting of isomannide, isoidide and isosorbide.

6. The process as claimed in claim 4, wherein the molecular weight of the isohexide-diacetal polymer of formula II is in the range of 3200-27600 g/mol.

7. The process as claimed in claim 4, wherein the molecular weight of the copolymer of isohexide-diacetal with long chain diol of formula III is in the range of 10000-30000 g/mol.

8. The process as claimed in claim 4, wherein the yield of the isohexide-diacetal polymer of formula II is in the range of 46-71%.

9. The process as claimed in claim 4, wherein the yield of the copolymer of isohexide -diacetal with long chain diol of formula III is in the range of 97-99%.

10. An isohexide-diacetal based polymer having a molecular weight between 3,200 and 27,600 g/mol, comprising Formula 1:

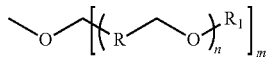

wherein R is =

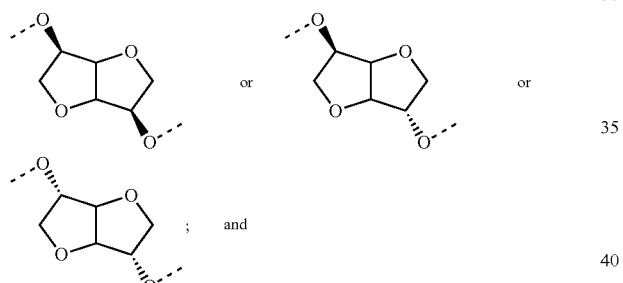

$R_1$ may be absent or if present it is = 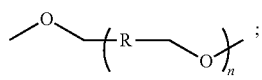 $p = 6\text{-}23$ $X = H, CH_2OCH_3$ wherein m ranges from 10-200 wherein the isohexide-diacetal based polymer of Formula 1 is represented by the compounds of formulae II and III, with R selected from the group consisting of isomannide, isosorbide and isoidide and, with respect to formula III, the variable m ranges from 10-200:

II)

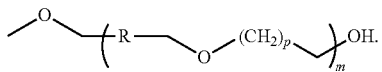

III)

11. The isohexide-diacetal based polymer of Formula 1 as claimed in claim 10 is represented by the group of the following compounds:

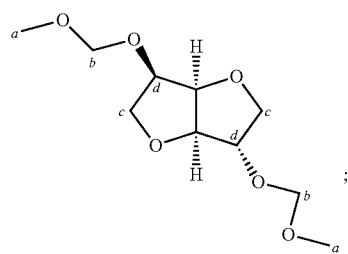

Isosorbide-diacetal

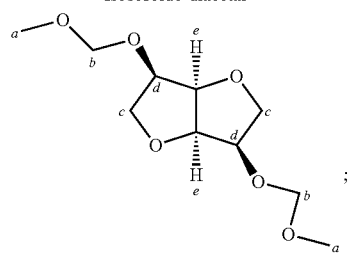

Isomannide-diacetal

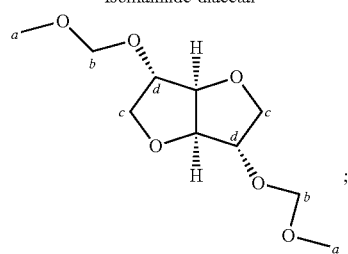

Isoidide-diacetal

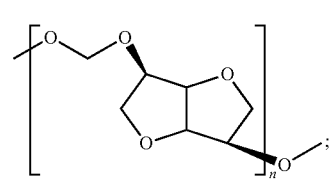

Polyisomannide-diacetal poly2a poly2b

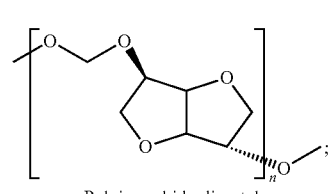

Polyisosorbide-diacetal poly2c

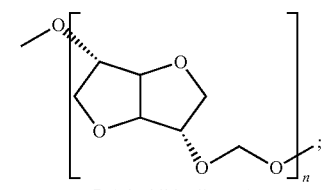

Polyisoidide-diacetal

Copolymer of isomannide-diacetal monomer and C6 to C23 linear diol, Copolymer of isosorbide-diacetal monomer and C6 to C23 linear diol, and Copolymer of isoidide-diacetal monomer and C6 to C23 linear diol.

* * * * *